United States Patent
Haralson et al.

(10) Patent No.: US 8,423,017 B2
(45) Date of Patent: Apr. 16, 2013

(54) AUTOMATIC UPDATING OF A PREFERRED ROAMING LIST STORED IN A VEHICLE TELEMATICS UNIT

(75) Inventors: Jessica L. Haralson, Lake Orion, MI (US); George A. Economos, Sterling Heights, MI (US)

(73) Assignee: General Motors LLC, Detroit, MI (US)

( * ) Notice: Subject to any disclaimer, the term of this patent is extended or adjusted under 35 U.S.C. 154(b) by 1416 days.

(21) Appl. No.: 12/059,331

(22) Filed: Mar. 31, 2008

(65) Prior Publication Data
US 2009/0247153 A1 Oct. 1, 2009

(51) Int. Cl.
*H04W 4/00* (2009.01)

(52) U.S. Cl.
USPC ............. 455/432.1; 455/414.1; 455/419; 455/435.2; 340/5.72; 340/994; 709/242

(58) Field of Classification Search .......... 455/432.1, 455/552.1, 419, 434, 435.3, 432.3, 436, 550.1, 455/553.1, 422.1, 414.1, 426.1, 432.2; 370/328, 370/338, 329, 331, 352, 389, 332, 381, 392, 370/335, 316; 709/250, 245, 246, 223, 247, 709/242; 707/999.001; 340/5.72, 994, 991
See application file for complete search history.

(56) References Cited

U.S. PATENT DOCUMENTS

| | | | |
|---|---|---|---|
| 6,564,055 B1 * | 5/2003 | Hronek | 455/433 |
| 7,835,691 B2 * | 11/2010 | Groskreutz et al. | 455/12.1 |
| 2005/0282489 A1 * | 12/2005 | Kamdar et al. | 455/3.02 |
| 2006/0079219 A1 * | 4/2006 | Nicolini | 455/423 |
| 2006/0128380 A1 * | 6/2006 | Uchida | 455/432.1 |
| 2006/0252427 A1 * | 11/2006 | Bridges et al. | 455/435.2 |
| 2008/0146223 A1 * | 6/2008 | Welnick et al. | 455/434 |

* cited by examiner

*Primary Examiner* — Mahendra Patel
(74) *Attorney, Agent, or Firm* — Anthony Luke Simon; Reising Ethington P.C.

(57) ABSTRACT

A method of updating a preferred roaming list (PRL) onboard a vehicle that wirelessly communicates with a call center and with a communications center over a wireless network. A communication link is established between the vehicle and the call center. A onboard PRL version number is transmitted from the vehicle to the call center where it is compared to a PRL version number stored at the call center. When the call center PRL version number differs from the onboard PRL version number, a PRL update flag is set at the vehicle. Thereafter, a communication link between the vehicle and the communication center is established. An updated PRL is downloaded from the communication center to the vehicle and stored therein, and the PRL update flag is then cleared.

17 Claims, 2 Drawing Sheets

AUTOMATIC UPDATING OF A PREFERRED ROAMING LIST STORED IN A VEHICLE TELEMATICS UNIT

TECHNICAL FIELD

The present invention relates generally to a method for updating a preferred roaming list, and more particularly to automatically updating a preferred roaming list stored by a motor vehicle.

BACKGROUND OF THE INVENTION

Most vehicles equipped with communication systems rely on existing communication networks to establish a communication link between the motor vehicle and a third party allowing the transmission of data therebetween. When a vehicle leaves its home region, it enters into a roaming mode where the vehicle will establish a communication link through a wireless network operated by a third party that may not be a part of the wireless network in its home region. In many situations, the provider of the wireless network will have a preferred roaming list so that when a communication device, be it a mobile phone or a vehicle communication system, leaves the home region, the communication device will establish a communication link through a provider of wireless communication services that has a relationship with the home region service provider. This reduces the costs to the user and the service provider of the home region. From time to time, the preferred roaming list of a service provider will change. Those changes may be transmitted to a communication device only when the subscriber of the services places a call to update the preferred roaming list. This is not done on a regular basis. In addition, the live call placed with the communication system to update the preferred roaming list may require a relatively large amount of time. This call, on the order of possibly three minutes, is too long to have a subscriber wait for its completion.

SUMMARY OF THE INVENTION

According to an aspect of the invention, there is provided a method for updating an onboard data set on a vehicle communicable with a call center and with a communications center over a wireless network. The method includes the step of establishing a communication link between the vehicle and the call center. A data set version identifier is transmitted between the vehicle and call center. The data set version identifier is compared with an onboard data set version identifier stored in the vehicle. When the data set version identifier differs from the onboard data set version identifier, a data set update flag is set. A communication link between the vehicle and the communication center is established. An updated data set is downloaded from the communication center to the vehicle to be stored therein.

In accordance with another aspect of the invention, there is provided a telematics unit for providing communications between a motor vehicle and a call center. The telematics unit includes a cellular chipset for transmitting and receiving electronic voice and data signals, an electronic processing device electrically connected to the cellular chipset, and a memory device electrically connected to the electronic processing device. The processing device controls the cellular chipset and is operable to upload vehicle data to the call center through the cellular chipset. The memory device includes a preferred roaming list flag settable between a current state and a outdated state such that the electronic processing device updates a preferred roaming list stored in the memory device by contacting a wireless provider and downloading the preferred roaming list therefrom using the cellular chipset.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The method described below automatically updates a preferred roaming list (PRL) onboard a vehicle in a manner which is quicker than a call and does not require the subscriber to initiate the process. This helps maintain the PRL in its most updated condition while reducing the minutes consumed in the process. In addition, the inventive method is automatic providing a better, cheaper, more reliable system to the subscriber while reducing the effort by the subscriber to maintain the PRL.

Communications System—

Figure 1:
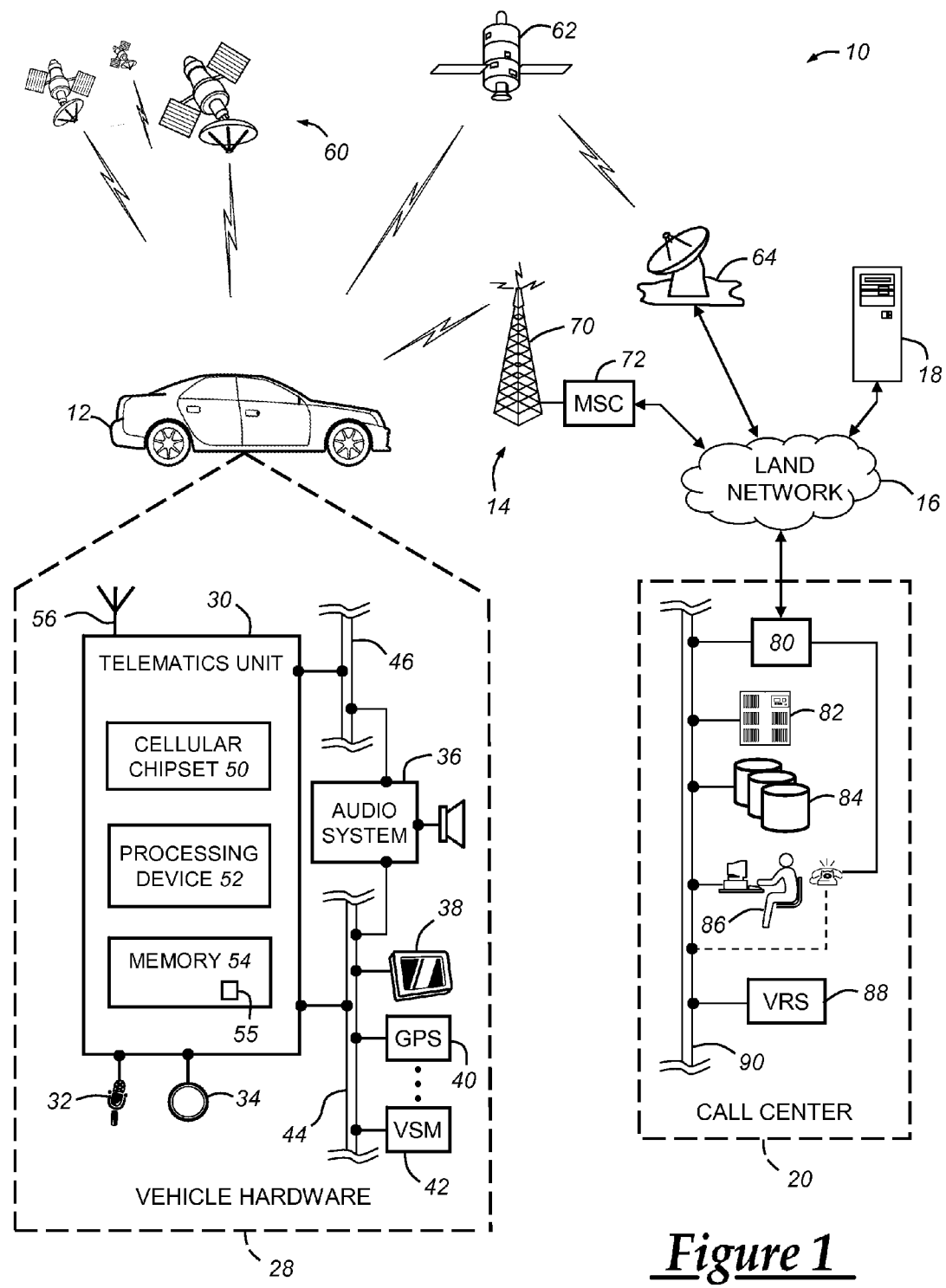
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. The memory device(s) 54 include a preferred roaming flag 55, which is a dedicated bit in memory that identifies when a preferred roaming list is outdated or whether it is current. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wireless according to one or more wireless protocols, such as any of the IEEE 802.11 protocols, WiMAX, or Bluetooth. When used for packet-switch data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used. Method—

Figure 2:
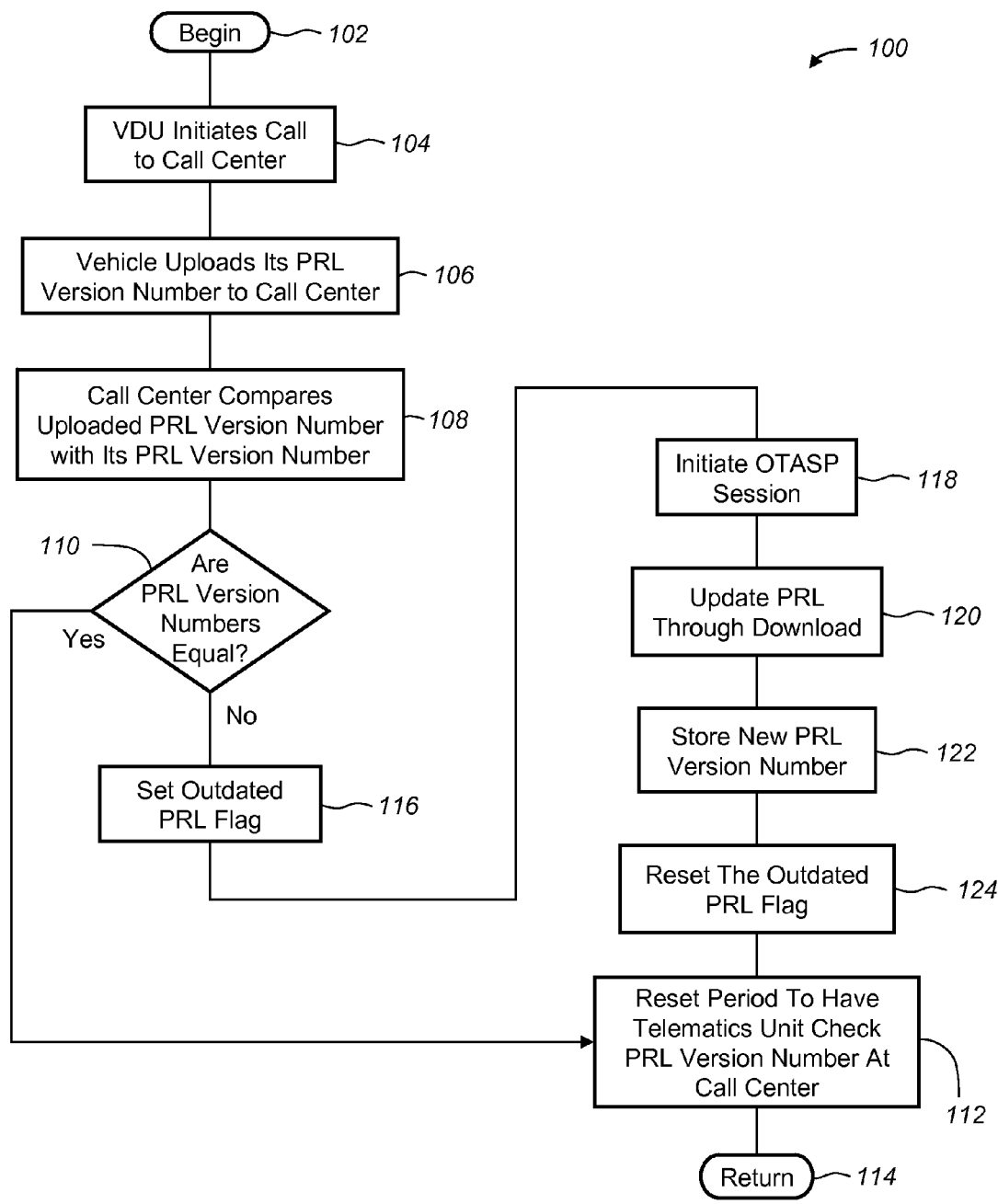
FIG. 2 is a logic chart of one embodiment of the inventive method.

Turning now to FIG. 2, there is a logic chart of the inventive method, which is generally indicated at 100. The method begins at 102. The telematics unit 30 initiates a vehicle data upload (VDU). In that VDU, a call is initiated to the call center 20 at 104. As a part of the VDU, the vehicle 12 transmits a data set version identifier to the call center 20 at 106. In the embodiment shown, the data set version identifier is an onboard PRL version number stored in the telematics unit 30, such as in its memory 54. Transmission of this onboard PRL version number to the call center can be done automatically or in response to a request for it from the call center. It should be appreciated by those skilled in the art that the PRL version number may be any type of data set version identifier and that the PRL version number is merely a specific embodiment of a data set version identifier that identifies a version of a data set or a database.

When the call center 20 receives the onboard PRL version number from the vehicle, the call center compares the uploaded PRL version number with a PRL version number stored at the call center, step 108. This call center PRL version number can represent the most recent PRL available for use by the vehicle, and it can be stored, for example, in the database 84. The call center then determines whether the PRL version numbers equal each other at 110. If the onboard PRL version number equals the call center PRL version number, then the PRL stored in the telematics unit 30 is up to date. If the PRL onboard the vehicle 12 is up to date, the method then resets a time period at 112 to have the telematics unit 30 check the PRL version stored at the call center 20. The period for which the telematics unit 30 would check the PRL version again may be set by the call center 20 based on the frequency in which the PRL is updated by the wireless carrier network 14. Alternatively, the period for which the telematics unit 30 is to check the PRL version numbers stored at the call center 20 may be programmed into the telematics unit 30. As another alternative, the time period can be set at the call center 20 and monitored there. Once the period for rechecking the PRL version number is set, the method returns at 114 and is terminated until the time period lapses at which time the call center 20 will initiate a check of the vehicle's onboard PRL version number during the next VDU.

If, however, the PRL version numbers are not equal, a data set update flag is set at 116, and this can be accomplished using a command sent from the call center to the vehicle telling it to set the flag. In the embodiment shown, the data set update flag is an outdated PRL flag and it is stored in the telematics unit 30 in the vehicle 12.

Sometime after the outdated PRL flag has been set, a communication link between the telematics unit 30 and a communications center (e.g., the wireless carrier network 14 in FIG. 1) is established at 118. In the embodiment shown in FIG. 2, the communication link between the telematics unit 30 or the vehicle 12 and the wireless carrier network or communications center 14 occurs during an over-the-air service provisioning (OTASP) session. The OTASP session may be initiated either immediately after the call with the call center 20 is terminated or at a period of time after which it is determined that it is proper to initiate the OTASP session. Depending on the operation or mode of the vehicle 12, determined through inputs from the vehicle system modules 42, the OTASP session may not be initiated for some time. In another embodiment, the OTASP session could be initiated while the telematics unit 30 is still on a call to the call center 20.

Once the OTASP session is initiated, the PRL is downloaded and updated at the telematics unit 30 at 120. In this step, the updated data set or PRL is downloaded to the telematics unit 30 and it replaces the onboard data set or PRL with the updated data set or PRL after the onboard data set has been erased. At that point, the downloaded PRL becomes the onboard PRL and is stored in the telematics unit 30 until at a later time at which the method 100 determines that the PRL version number associated with the new onboard PRL is out of date.

After the PRL is downloaded and stored in the telematics unit 120, the PRL version number associated with the now onboard PRL is stored at 122. The storage of the new PRL version number, which becomes now the onboard PRL version number, is done at the telematics unit 30. The outdated PRL flag is then reset at 124.

After the outdated PRL flag has been reset, the period for which the telematics unit 30 is to check the PRL version number again is reset at 112. The method then returns at 114 to begin at 102 after the expiration of the period in which the telematics unit 30 is to check to see if the onboard PRL version number is still up to date with respect to the information stored at the call center 20.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, although steps 106 and 108 of FIG. 2 involve sending the onboard PRL version number to the call center where it is compared to the most current one, it will be appreciated that the version number transmitted between the vehicle and call center can be carried out in either direction with the comparison then being done at the receiving end. Thus, the call center's PRL version number could be sent to the vehicle and the comparison made there. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

What is claimed:

1. A method for updating an onboard data set on a vehicle having a vehicle telematics unit communicable with a call center and with a communications center over a wireless network, the method comprising:
   establishing a communication link between the vehicle telematics unit and the call center;
   transmitting a data set version identifier belonging to an updated preferred roaming list between the vehicle telematics unit and the call center, wherein the data set version identifier is transmitted in response to a request from the call center, the expiration of a time period, or an event;
   comparing the data set version identifier with an onboard data set version identifier stored in the vehicle;

setting a data set update flag when the data set version identifier differs from the onboard data set version identifier;

establishing a communication link between the vehicle and the communications center using over-the-air service provisioning; and downloading an updated data set representing the updated preferred roaming list from the communications center; and storing the updated preferred roaming list at the vehicle as a new onboard preferred roaming list.

2. A method as set forth in claim 1 including the step of erasing the onboard data set and the onboard data set version number.

3. A method as set forth in claim 2 including the step of resetting the data set update flag after the step of downloading the updated data set.

4. A method as set forth in claim 3 including the step of terminating the method after the step of comparing when the data set version identifier matches the onboard data set version number and transmission of the data set version identifier is complete.

5. A method as set forth in claim 4 including the step of terminating the communications link between the vehicle and the call center prior to the step of establishing the communications link between the vehicle and the communications center.

6. A method for updating an onboard preferred roaming list on a vehicle having a vehicle telematics unit communicable with a call center and a wireless service provider over a wireless network, the method comprising:

calling the call center from the vehicle telematics unit;

transmitting an onboard preferred roaming list version number from the vehicle telematics unit to the call center, wherein the preferred roaming list version number is transmitted in response to a request from the call center, the expiration of a time period, or an event;

comparing a call center preferred roaming list version number that represents a most-recent preferred roaming list for use with the vehicle telematics unit with the onboard preferred roaming list version number;

setting a preferred roaming list flag when the call center preferred roaming list version number differs from the onboard preferred roaming list version number;

establishing a communications link between the vehicle telematics unit and the wireless service provider over the wireless network;

downloading an updated preferred roaming list from the wireless provider using over-the-air service provisioning; and storing the updated preferred roaming list at the vehicle as a new onboard preferred roaming list.

7. A method as set forth in claim 6 including the step of erasing the onboard preferred roaming list and the onboard preferred roaming list version number.

8. A method as set forth in claim 7 including the step of resetting the preferred roaming list update flag after the step of downloading the updated preferred roaming list.

9. A method as set forth in claim 8 including the step of terminating the method after the step of comparing when the preferred roaming list version number matches the onboard preferred roaming list version number and transmission of the onboard preferred roaming list version number is complete.

10. A method as set forth in claim 6 including the step of terminating the communications link between the vehicle telematics unit and the call center prior to the step of establishing the communications link between the vehicle and the wireless network.

11. A method as set forth in claim 6 including the step of delaying the step of establishing the communications link with the over-the-air service provisioning until after a predetermined time has lapsed from the step of terminating the call.

12. A method as set forth in claim 6 including the step of delaying the step of establishing the communications link with the over-the-air service provisioning until after an occurrence of a predetermined event.

13. A method as set forth in claim 6 wherein the transmitting step is carried out in response to receiving a request for the onboard preferred roaming list version number from the call center.

14. A telematics unit for providing communications between a motor vehicle and a call center, said telematics unit comprising:

a cellular chipset for transmitting and receiving electronic voice and data signals;

an electronic processing device electrically connected to said cellular chipset for controlling said cellular chipset, said electronic processing device uploading vehicle data to the call center through said cellular chipset; and a memory device electrically connected to said electronic processing device, said memory device including a preferred roaming list flag settable between a current state and a outdated state such that said electronic processing device updates a preferred roaming list stored in said memory device by contacting a wireless provider and downloading the preferred roaming list therefrom using said cellular chipset, wherein the electronic processing device:

compares a current data set version identifier received from a central facility with an onboard data set version identifier stored in the memory device, wherein the comparison is carried out in response to a request from the call center, the expiration of a time period, or an event;

sets the preferred roaming list flag to outdated when the current data set version identifier differs from the onboard data set version identifier, and stores the updated preferred roaming list as a new onboard preferred roaming list.

15. A telematics unit as set forth in claim 14 wherein said electronic processing device controls said cellular chipset to establish communication with the wireless service provider in an over-the-air service provisioning mode.

16. A telematics unit as set forth in claim 15 including input ports electrically connected to vehicle system modules to receive data based on the operation of the vehicle.

17. A telematics unit as set forth in claim 16 wherein said electronic processing device controls said cellular chipset in the over-the-air service provisioning mode depending on data sent to said electronic processing device from the vehicle system modules.

* * * * *